United States Patent
Lyons et al.

(10) Patent No.: US 6,484,180 B1
(45) Date of Patent: Nov. 19, 2002

(54) ACCESSING DOMAIN OBJECT DATA STORED IN A RELATIONAL DATABASE SYSTEM

(75) Inventors: Liza Lyons; Christopher Broadbent, both of Redwood Shores; Larry Harris, Fremont; Barry Lind, Union City, all of CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/365,663

(22) Filed: Aug. 2, 1999

(51) Int. Cl.[7] .............................................. G06F 17/00
(52) U.S. Cl. ..................................... 707/103 R; 707/3
(58) Field of Search ................................ 707/102–103, 707/3, 6; 705/79, 34, 27, 7, 34.7; 709/215, 218, 249, 217, 201–203; 717/1; 706/46.61

(56) References Cited

U.S. PATENT DOCUMENTS

| | | | | |
|---|---|---|---|---|
| 5,263,167 A | * | 11/1993 | Conner, Jr. et al. | 707/4 |
| 5,550,971 A | * | 8/1996 | Brunner et al. | 707/3 |
| 5,765,159 A | * | 6/1998 | Srinivasan | 707/102 |
| 5,864,844 A | * | 1/1999 | James et al. | 707/4 |
| 5,913,205 A | * | 6/1999 | Jain et al. | 707/4 |
| 6,049,807 A | * | 4/2000 | Carroll et al. | 707/201 |
| 6,151,601 A | * | 11/2000 | Papierniak et al. | 707/10 |

* cited by examiner

Primary Examiner—John Breene
Assistant Examiner—Mohammad Ali
(74) Attorney, Agent, or Firm—Hickman Palermo Truong & Becker LLP; Marcel K. Bingham (57) ABSTRACT

A method and apparatus are provided for supplying data to users through "query objects", where the data corresponds to attributes of domain objects and is stored in a relational database. The query objects create a bridge between the information the user wants to see (as expressed in the user interface presented to the user), the object model in which domain logic is implemented, and the relational model in which the data is stored. Thus, data used to populate the user interface is queried directly from the data model and returned in the shape required by the user interface. As the query results are read into memory, objects that model the data using object-oriented techniques are instantiated. Subsequent manipulation of the data is redirected to those objects, thereby preserving data encapsulation and allowing reuse of existing logic.

33 Claims, 9 Drawing Sheets

ACCESSING DOMAIN OBJECT DATA STORED IN A RELATIONAL DATABASE SYSTEM

BACKGROUND OF THE INVENTION

Relational databases store information in tables, each of which has one or more columns and zero or more rows. Relationships may be defined between two or more tables to reflect real-world relationships between what is represented by the data contained in those tables. Database systems are very good at responding to queries that are written in terms of the relational model in which they store data.

Frequently, the data stored in a database corresponds to real world items. For example, a database may store information about the purchase orders received by a company. The real world items that are represented by the relational data are often constrained by limitations inherent in the real world domain of those items. For example, it may be company policy that P.O. boxes cannot be used as the mailing address for purchase orders. Rules that apply to data items, such as the "no P.O. box mailing address" rule, are generally referred to as "domain logic".

Ideally, the database applications used to store information in a database implement the domain logic that applies to that information. For example, the database application used to enter purchase orders into a database should check the mailing address specified for each purchase order, and reject the address if it specifies a P.O. box.

Frequently, database application designers tie the domain logic that applies to a data item to the user interface component that is used to present the data item to a user. For example, the database application may present the user with a user interface that includes a user interface component (e.g. a text field) for receiving a mailing address. The application designer associates with that text field domain logic that checks to determine whether the text within the UI component represents a P.O. box. Using a database application design tool, the association of the "no P.O. box" domain logic with the text field may be accomplished by (1) selecting a user interface control associated with the text field, where the user interface control allows entry of validation logic for the text field, and (2) entering validation logic that verifies that the text in the text field does not specify a P.O. box.

Unfortunately, the domain logic thus created is tied to that particular UI component in the user interface, not to the mailing address information itself. Thus, if the application presents the mailing address information in another UI component of a second, different user interface, the "no P.O. box" domain logic would have to be repeated and tied to that other UI component as well. This would involve, once again, entry of validation logic that verifies that the text in the text field does not specify a P.O. box.

Tying the domain logic to user interface components tends to produce applications where the domain logic of the application is "scattered" among the various user interface components. The decentralized nature of the domain logic creates severe problems when, for example, the domain logic for a given type of data item must be modified. For example, if the company decided that mailing addresses can be P.O. boxes if the P.O. boxes are within a particular state, then the application programmer would have to make the appropriate revisions to the validation logic of each user interface component that allows entry of mailing addresses.

Object oriented programming provides certain benefits that the relational model does not. Object oriented programming allows programmers to model real-world things, such as purchase orders, in a way that they find intuitive. It also allows the domain logic that applies to those real-world things to be "encapsulated", and the code that implements that logic to be re-usable. To achieve these benefits, applications that interact with relational databases are often written so that data is modeled using objects, even though the data for those objects is actually stored in a relational database.

Unfortunately, applications that model data using an object model frequently do so at the cost of sacrificing the efficiency of the relational model. For example, in the relational model, if a user only wants to see data from a particular column, data is only retrieved from that column. In an object model, if a user only wants to see data from a particular attribute of a particular object, the entire object may have to be instantiated before the one attribute value is supplied to the user. At the database level, instantiating the object may involve performing complex joins between multiple tables, and retrieving significantly more data than the user actually wants to see.

The following scenario illustrates the problem of systems that include components that must work together, but which model the same data differently. Specifically, a system for creating purchase orders will be described in which a database server that stores the data persistently uses a relational or "data model", the JAVA runtime classes that manipulate the data use an object model, and multiple user interfaces, representing distinct end-user applications, present the data to users.

The Data Model

Figure 1:
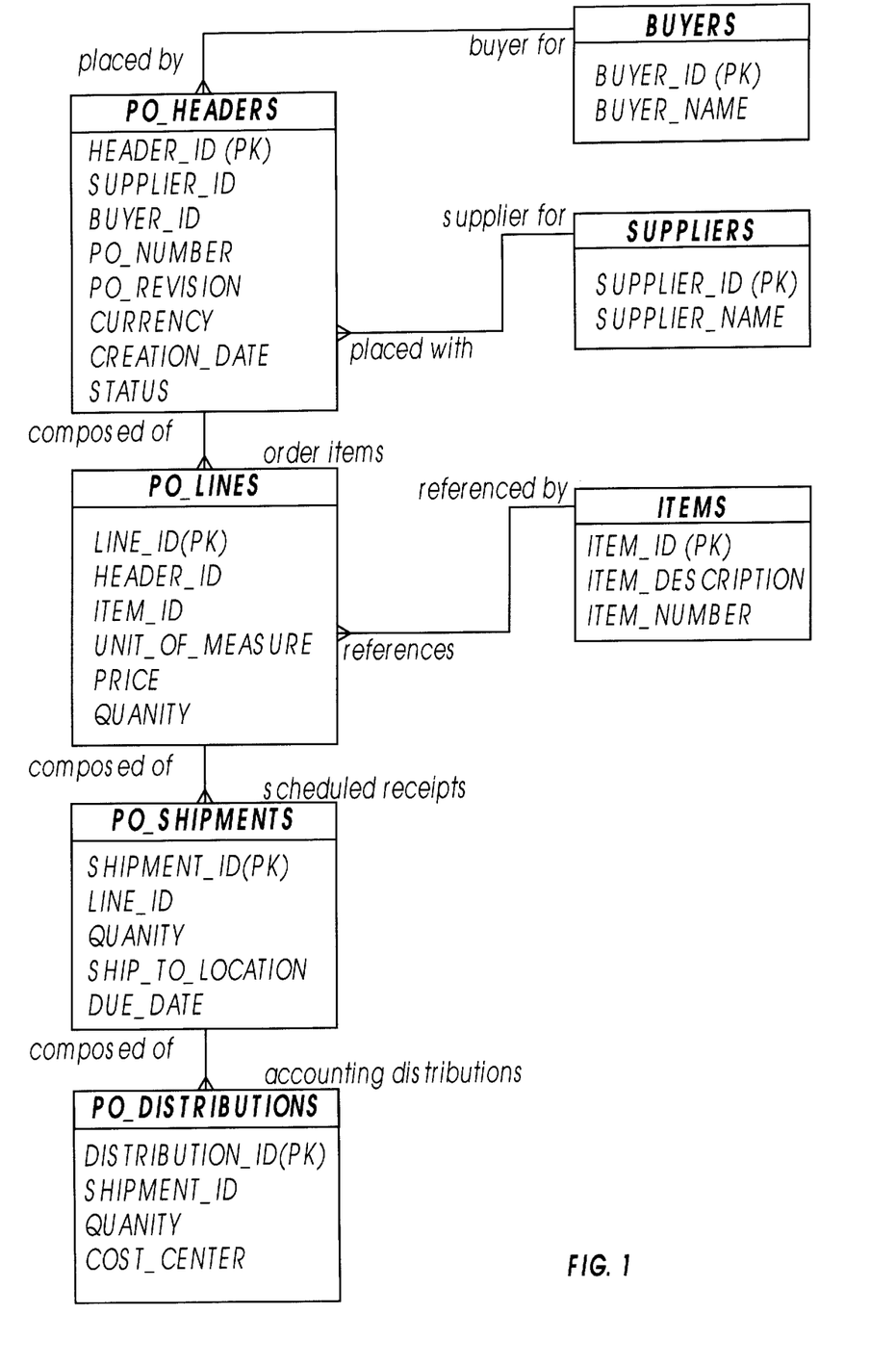
FIG. 1 is a block diagram illustrating an example of a relational model for storing purchase order information.

Referring to FIG. 1, it illustrates the data model for a Purchase Order that could be used by a relational database server. A Purchase Order is a contractual document that includes information describing the buyer, the seller, the goods and services being procured, delivery information and internal accounting.

In the schema shown in FIG. 1, the purchase order (PO) is modeled as a Header which has one or more Lines. Each Line has one or more Shipments, and each shipment has one or more Distributions.

The Header (PO_HEADERS table) stores information pertaining to the entire document (e.g. Buyer, Document Total, Approval Status, Supplier and so on). A purchase order has one and only one header.

The Line (PO_LINES table) stores information about what the buyer wants to order (e.g. Item Number and Description, Unit of Measure, Price, Order Quantity).

A purchase order must have at least one line, and may have more than one if the buyer wants to order different goods and services from the same supplier.

The Shipment (PO_SHIPMENTS table) stores information about where and when the order is to be delivered (e.g. Ship-To Location, Due Date, Shipment Quantity).

A line must have at least one shipment and may have more than one if the buyer wants a single order quantity to be shipped to multiple receiving docks, or shipped to the same dock on several different dates. If a line has>1 shipment, the total quantity of all shipments must equal the line quantity.

The Distribution (DISTRIBUTIONS table) stores information pertaining to the internal accounting for each shipment (e.g. Cost Center, Distribution Quantity).

Each shipment must have at least one distribution and may have more than one if the buyer needs to allocate procurement costs to multiple accounts. If a shipment has>1 distribution, the total quantity of all distributions must equal the shipment quantity.

In accordance with standard relational design, each of the Purchase Order tables store IDs (foreign keys) for referenced entities. In this example, the Purchase Order Header table (P_HEADERS) stores a buyer ID and a supplier ID. The Line table (PO_LINES) stores an item ID. To obtain the Buyer Name, Supplier Name, Item Number and Item Description these foreign keys must be resolved using a join to their corresponding primary key in the referenced tables (BUYERS, SUPPLIERS and ITEMS respectively).

Finally, within the Purchase Order itself, each child entity stores the unique identifier of its parent entity.

The Object Model

While the data model is optimized for quick data storage and retrieval, the object model is optimized for effective domain logic implementation at runtime and code reuse. Fundamental to the object model is the concept of domain objects. Domain objects are objects that represent items of significance in the real world that can be modeled and implemented in software. Domain objects can exist in any domain—business, scientific, natural, etc. Domain objects encapsulate the application behavior or "domain logic" that is relevant for the domain of the items they represent.

Figure 2:
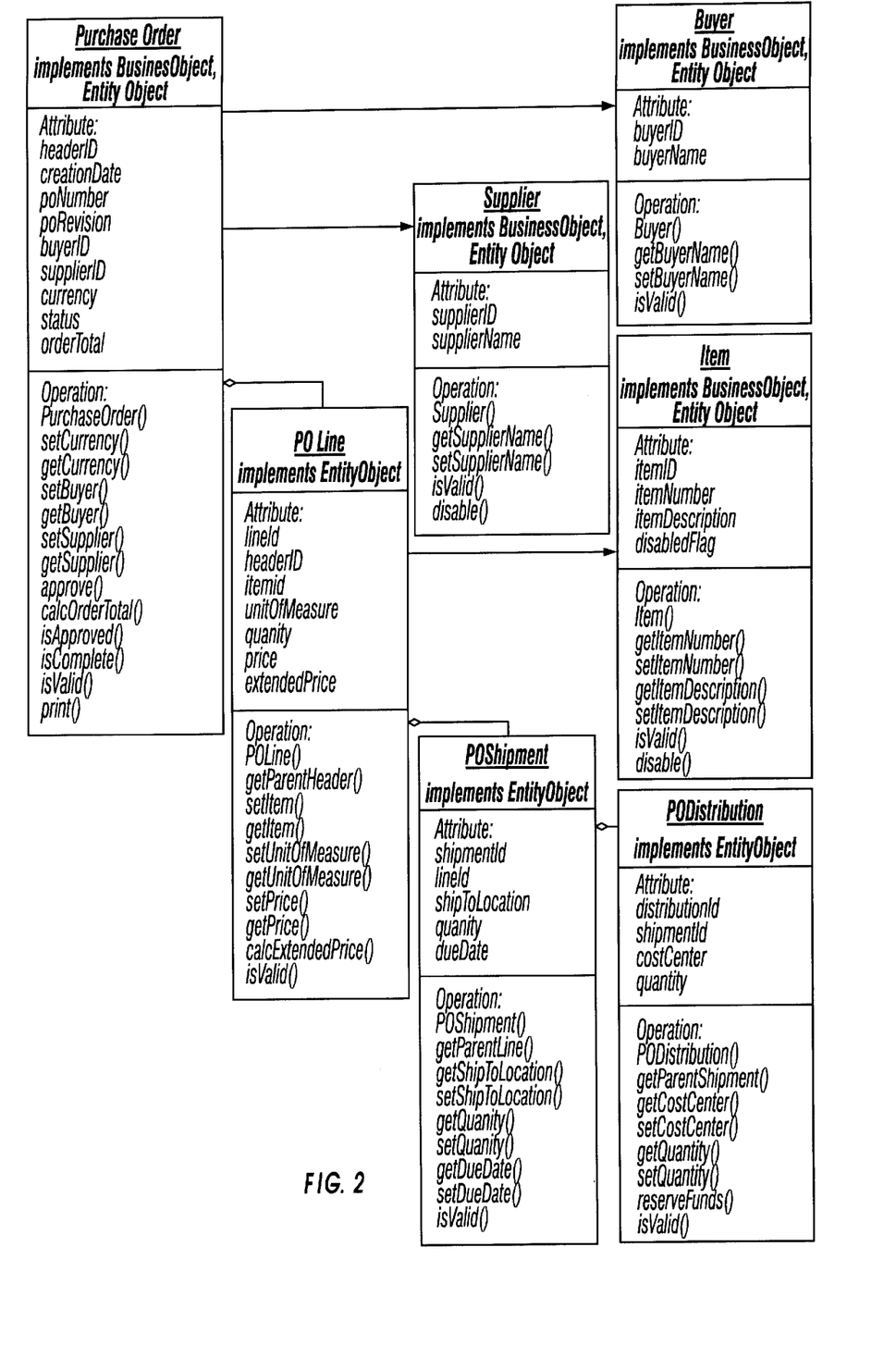
FIG. 2 is a block diagram illustrating an example of an object model for storing purchase order information.

For example, complicated domain logic may be encapsulated within domain objects that are implemented in reusable bundles of Java classes. FIG. 2 is a block diagram that illustrates an object model, implemented in Java classes, for four Domain objects: Purchase Order, Supplier, Buyer and Item. Note that domain objects can include calculated values that are not stored in the database.

To illustrate the benefit of encapsulated logic, assume that a company has a policy against shipping to P.O. box addresses. In the object model illustrated in FIG. 2, the ship-to address corresponds to the shipToLocation attribute of the POShipment object. Every time a shipToLocation attribute is retrieved, it is retrieved by calling the getShipToLocation() method of the POShipment object. Every time a shipToLocation attribute is stored, it is stored by calling the setShipToLocation( ) method of the POShipment object. Thus, the "no P.O. box" rule can be implemented by adding logic to a single location: the setShipToLocation( ) method. This logic will be executed regardless of the user interface UI components through which a user attempts to set the ship-to address, since the logic is tied to the shipToLocation attribute and not to the user-interface UI components themselves.

Consequently, if the company decides to accept ship-to P.O. boxes for a particular state, the company may do so simply by modifying the logic of the setShipToLocation( ) method. The modifications will take effect everywhere that the ship-to address attribute is manipulated because the logic is tied to the attribute, not the user interface.

The User Interface

Figure 3:
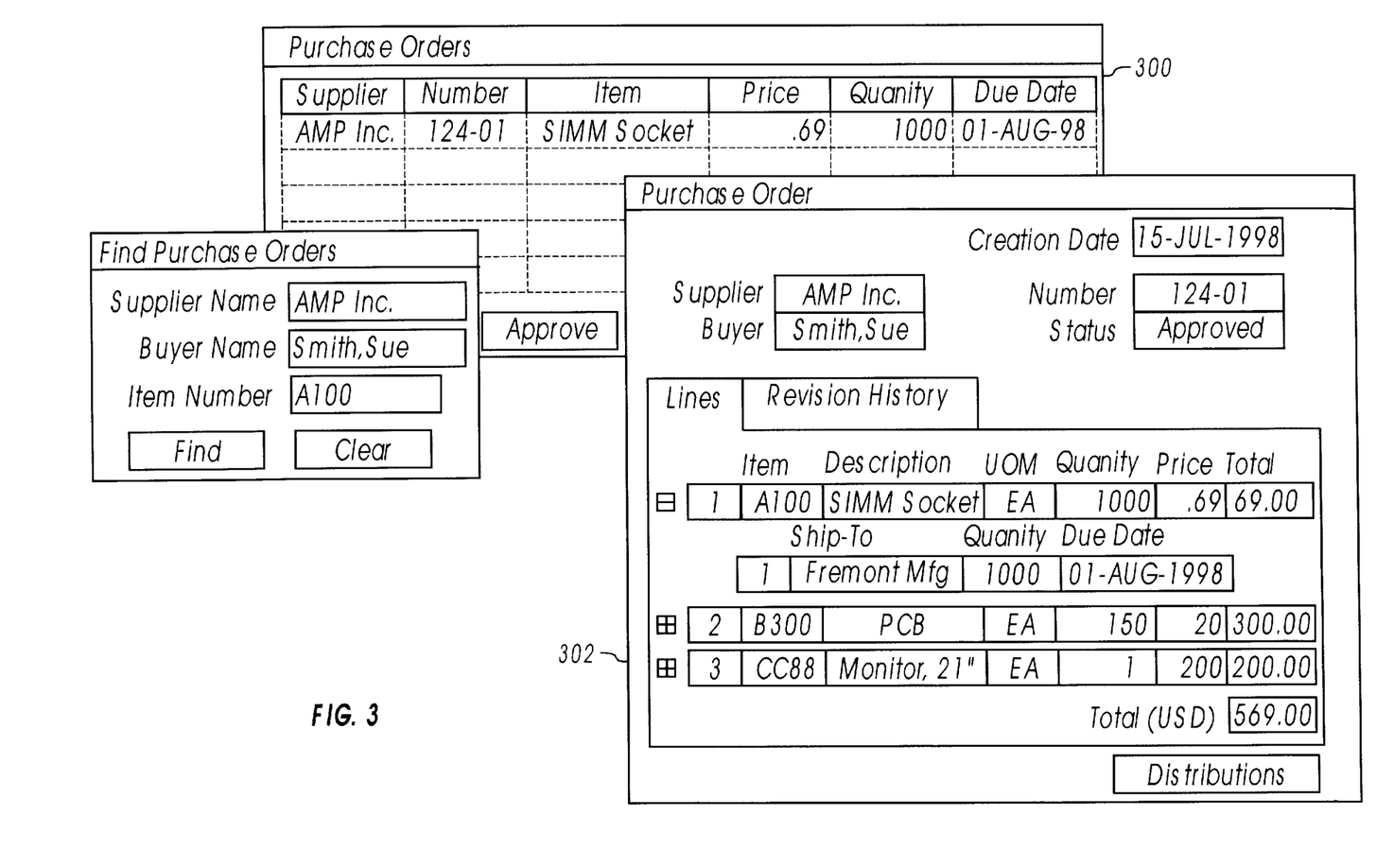
FIG. 3 is a block diagram illustrating an example of user interfaces to display purchase order information.

The data stored using the relational model of FIG. 1 and retrieved using the object classes of FIG. 2 may actually be presented to users using the interfaces shown in FIG. 3. For example, assume that a Company X has installed an application which includes a Purchase Order module that generates user interface 302. Since user interface 302 displays every possible data value for a PO—and the business process of Company X requires only a small subset of those values while defaulting many of the values—Company X has built a custom Purchase Orders module that generates interface 300, which lets Company X display just a few relevant UI components in a spreadsheet-like format for speedy data entry and review.

The business rules governing the data validation are the same for both modules, and the underlying data model provided by the database server is the same. The only thing that is different is the "shape" and content of the data as presented to the user.

Not only does Company X want to display fewer data values to the user, they never create multiple shipments or distributions, so there is no reason to complicate the data entry process by displaying this information in a hierarchical user interface. In fact, it is not even necessary for the buyers in Company X to know that the underlying object and data models have the concept of shipments and distributions within their internal architecture.

The problem associated with storing data using the relational model illustrated in FIG. 1, and manipulating it using the object model illustrated in FIG. 2, and presenting it using the interface illustrated in FIG. 3, is illustrated by the following scenario.

When a software engineer in Company X's IT group is assigned the task of building the custom user interface 300, the software engineer may realize that this is the first of what is likely to be several requests for custom PO applications. For example, the software engineer may have already heard from someone who wants an HTML front end for key suppliers to create their own POs based on weekly planning data.

The software engineer also does not want to recreate the domain logic coded in the Purchase Order domain object since that would not add any value to the custom application, but will introduce problems when the company upgrades to the next release of the Purchase Order domain object.

The problem that presents itself is how to easily reuse the Domain objects (while preserving encapsulation) and the underlying data model when neither matches the "shape" of the data as perceived by the user through different user interfaces. When presented with this problem, the object-oriented approach would dictate that data should only be accessed through a class's public get() methods, and therefore user interface components that expect to be mapped to a datasource should be mapped directly to the domain objects that own the data.

Unfortunately, the pure object-oriented strategy has several drawbacks. For example, the "shape" of the object model does not necessarily mirror the underlying data model, and neither of these has to match the user interface. Direct dependence on the Domain object classes to serve up data make it difficult to tailor performance for different user interfaces. The temptation is to build different domain objects for each user interface, which defeats the goal of code reuse.

Also, using the pure object-oriented strategy, there are performance penalties that are caused by fully populating a domain object (plus references) every time the user wants to see a data value. In the example given in FIG. 1, each of the objects has only a few values. However, in real world scenarios, objects routinely have hundreds of attributes, the attribute values are stored in tables that have millions of rows, and the objects have 25+ references to other objects that are equally complex. Under these conditions, it is difficult to efficiently handle queries when the user is going to be driving the query with referenced data values, as in the query "find all POs for the Supplier AMP".

Further, if the domain objects are instantiated on the client, data for all of the non-requested attributes will have to be sent from the server to the client. The percentage of communication bandwidth consumed by the transmission of data for attributes that are not even needed by the user interface may vastly exceed the bandwidth consumed by the transmission of the requested data. Thus, instantiating client-side domain objects is particularly inefficient in environments where the communication channel between the client and server represents a bottleneck.

Based on the forgoing, it is clearly desirable to provide a mechanism that allows the domain logic associated with data stored in a database to be encapsulated, but which does not incur the performance penalties associated with a pure object-oriented approach.

SUMMARY OF THE INVENTION

According to one aspect of the invention, a mechanism is provided that achieves the benefits of both the relational model and the object oriented model. Specifically, data is supplied to users through "query objects", where the query objects create a bridge between the information the user wants to see (as expressed in the user interface presented to the user) and the relational model. Thus, data used to populate the user interface is queried directly from the data model and returned in the shape required by the user interface. As the query results are read into memory, objects that model the data using object-oriented techniques are instantiated. Subsequent manipulation of the data is redirected to those objects, thereby preserving data encapsulation and allowing reuse of existing logic.

According to another aspect of the invention, the objects associated with the data that is retrieved through a query object are lazily populated. For example, when instantiating a particular object that has thousands of attributes, the values for all of the attributes are not automatically retrieved. Rather, those values that are already being retrieved in response to the query are used to populate their corresponding attributes, while other attributes of the object are only populated on an as-needed basis. In a preferred embodiment, all of the attributes for the object are retrieved as soon as a method needs a value that was not populated when the object was instantiated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are described for accessing from a relational database system data that belongs to domain objects. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A mechanism is provided to deliver data from a relational data store to a user interface in whatever shape the user interface developer needs to satisfy a user interface design while still preserving the encapsulation and reuse of existing domain logic. According to one embodiment, the mechanism uses what is referred to herein as a "QueryObject" to retrieve relational data to populate the user interface. The QueryObject acts as an intermediary between the underlying data model, the object model and the user interface.

At the user interface level, individual user interface components are bound to the QueryObject data elements. Using the QueryObject, data is queried directly from the data model using an optimized SQL statement, and returned to the user interface in the shape required by the user interface.

As query results are read into memory, domain objects are instantiated based on a predefined mapping between the retrieved data items and object class definitions. Subsequent manipulation of the data is redirected to the domain objects to which the data maps, thereby preserving data encapsulation and allowing reuse of existing domain logic.

Relational-structure-to-object-structure MAPPING

According to one embodiment, a mapping is established between relational structures (e.g. tables and columns) and object-oriented structures (e.g. classes and attributes). Thus, a data item in a particular column of a particular row may, for example, correspond to an attribute of an object that belongs to a particular object class. For example, the PO_Number column of the PO_HEADERS table illustrated in FIG. 1 maps to the poNumber attribute of the PurchaseOrder object class illustrated in FIG. 2. Consequently, a value in the PO_Number column of a particular row of the PO_HEADERS table is the attribute value of the poNumber attribute of a particular instance of the PurchaseOrder object class.

A variety of well known techniques may be used to establish relational-structure-to-object-structure mappings. For example, object class definitions may be registered with the database system, where the definition of a particular object class indicates the mapping between the existing database structures and the attributes of the class.

According to one embodiment of the invention, the relational-structure-to-object-structure mapping is performed by establishing domain object classes as groups of entity object classes, where the entity object classes have a high correlation to the relational structures. A domain object may also be defined, for example, as an interface, as a "wrapper" class, or with some other designation that marks a root entity object as a domain object.

While many techniques may be used for establishing a relational-structure-to-object-structure mapping, the present invention is not limited to any particular technique. Thus, any technique may be used as long as it is possible to identify the object and object class to which a particular relational data item corresponds (e.g. to determine that a value from a particular column of a particular row of a particular table corresponds to a particular attribute of a particular object of a particular object class).

Query Objects

According to one embodiment, a query object is a query which, when executed, (1) retrieves data directly from a relational source, and (2) causes the object(s) that correspond to the retrieved data to be instantiated but not automatically fully populated.

To populate UI components of a user interface, a query object is created that specifies the way the user interface desires the data to be presented. For example, the query object specifies the values the user interface needs to present, and the tables that those values come from. The data retrieved by the query may belong to one or more object classes, as indicated by the relational-structure-to-object-structure mapping. When the query is executed, objects that belong to those object classes are instantiated to store the data retrieved by the query.

According to one embodiment, the objects thus instantiated are lazily completed. That is, the attributes of those objects are not populated with data until they must be. Initially, only the attributes of the instantiated objects that correspond to data actually retrieved by the query are populated. Object attributes that store data that was not specifically retrieved by the query are not initially populated.

The attributes of the instantiated objects that are not initially populated are populated on an as-needed basis. For example, when a method of the object is invoked, if the method accesses values from a particular set of attributes of the object, then values are retrieved for the attributes that (1) belong to that particular set of attributes, and (2) have not already been populated. In a preferred embodiment, all of the attributes for the object are retrieved as soon as a method needs a value that was not populated when the object was instantiated.

According to one embodiment, the objects themselves are maintained on the server. Only those values retrieved by the query are sent to the client, even though the methods that are used, for example to validate that data that is requested by the query, may take into account the values of other attributes of the object, where the other attributes are not retrieved by the query.

Figure 4A:
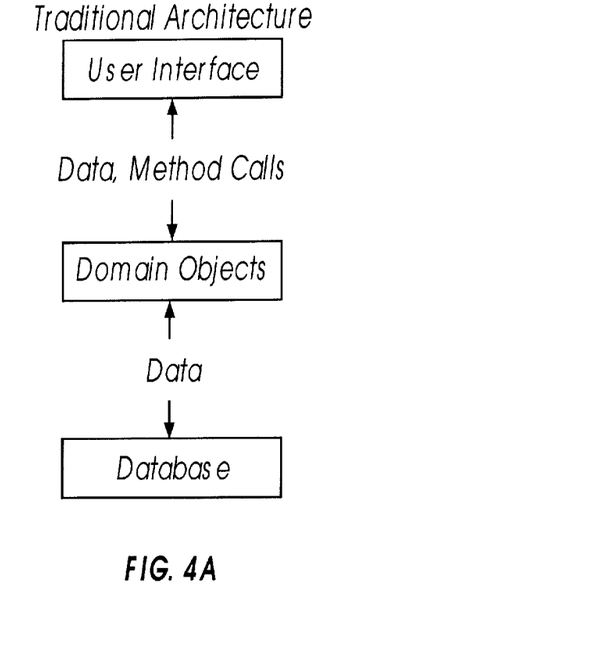
FIG. 4A is a block diagram illustrating the traditional object oriented architecture for retrieving and manipulating data that belongs to domain objects.
Figure 4B:
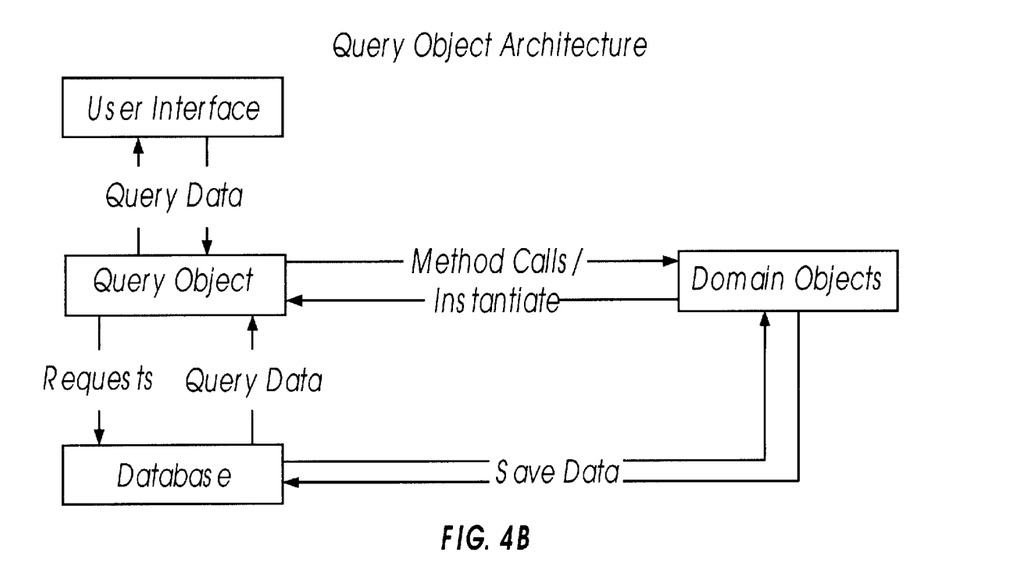
FIG. 4B is a block diagram illustrating the architecture for retrieving and manipulating data that belongs to domain objects according to an embodiment of the invention.

FIGS. 4A and 4B are block diagrams that illustrate the conceptual differences between the traditional architectural approach (FIG. 4A) and the QueryObject approach (FIG. 4B) used by an embodiment of the invention. Using the QueryObject approach, the nature of the relationship between the user interface and the domain objects is unchanged relative to the traditional approach. The data handling, however, is significantly improved.

The differences shall be illustrated in reference to the scenario, described above, in which Company X wants to build a customized "spreadsheet" purchase order user interface. In this scenario, the Purchase Order data is stored in the tables shown in FIG. 1, with one-to-many relationships between the tables based on the following business rules:

For each purchase order placed with a supplier, many different items or services may be ordered.

For each item ordered, several shipments over a period of time may be received.

For each shipment received, the quantity received may be allocated to many requestors or cost centers.

These business rules governing the data model design are sound, but for some customers they implement unnecessary features—and add corresponding user interface complexity.

In the scenario at issue, Company X creates a separate line item for each scheduled receipt, and then charges this purchase to a single materials cost of goods account. Given these requirements, the purchase order can be "flattened" from a four-level document (e.g. user interface 302 of FIG. 3) to a one-level document (e.g. user interface 300 of FIG. 3) for data entry purposes. Behind the scenes, however, the four-tier structure continues to be maintained by the Purchase Order domain object (where most of the data is defaulted).

FIG. 4A illustrates the traditional object-oriented approach in which all data required by the user interface is retrieved through the domain objects to which the data belongs. This approach results in various performance penalties, such as the overhead required to fully instantiate the domain objects, as described above.

FIG. 4B, which illustrates the QueryObject approach, in which data is retrieved directly from the relational source structure, not through the objects to which the data belongs. Those objects, however, are instantiated and completed on an as-needed basis. According to one embodiment, the only attributes of the object that are initially populated are the attributes that correspond to the data actually retrieved by the QueryObject. As methods of the objects are invoked, other attributes are populated as needed to execute the invoked methods.

USER INTERFACE Binding to QUERY OBJECT

Figure 5:
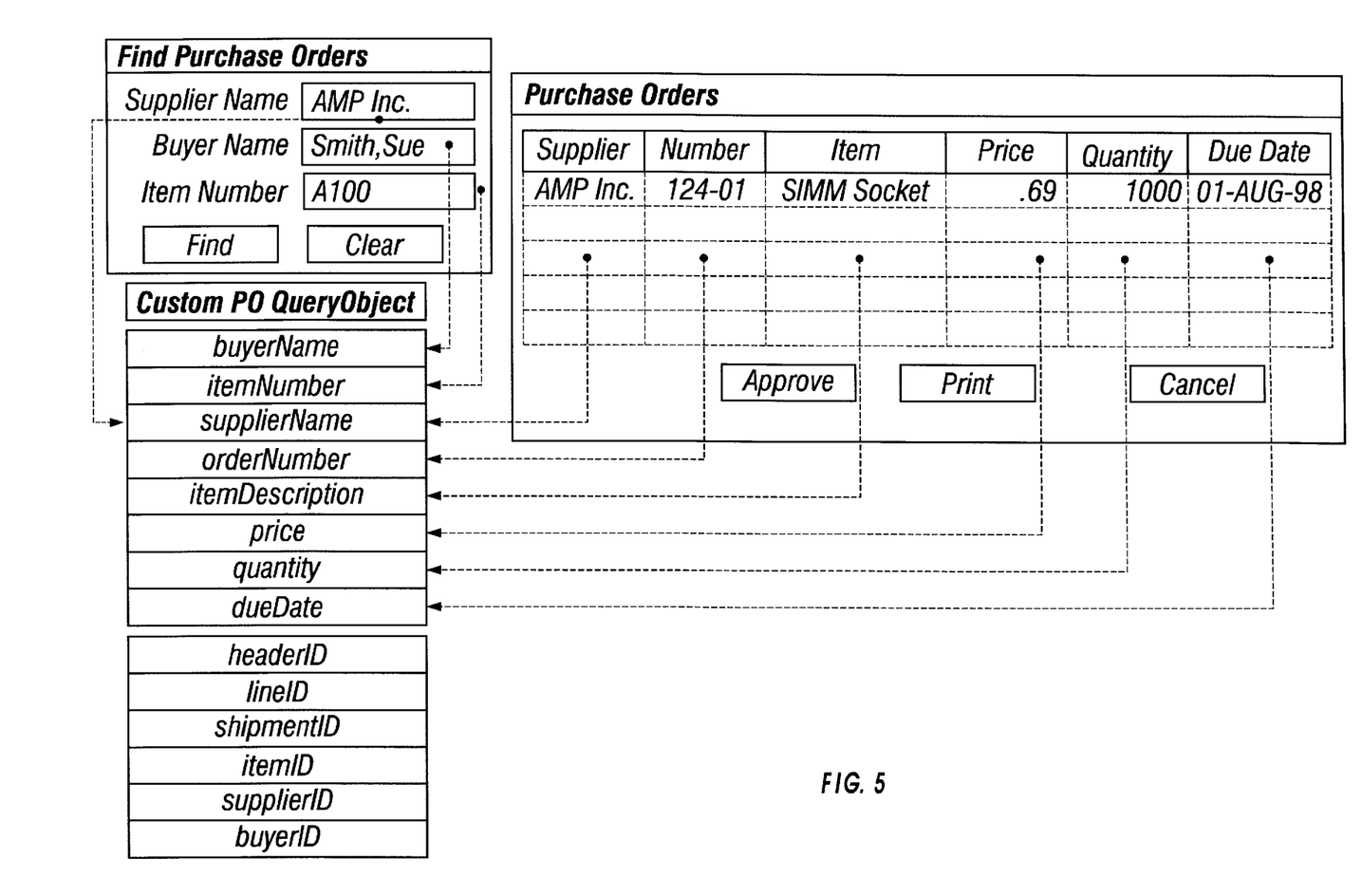
FIG. 5 illustrates the correlation between items in a query object and items displayed in a user interface.

FIG. 5 shows the user interface relationship to a QueryObject that represents the key data items in the spreadsheet view. As is illustrated in FIG. 5, once an attribute has been selected for inclusion in the QueryObject, the identifying primary key(s) of the associated business entities are automatically selected for inclusion as well.

A QueryObject for retrieving the data required by user interface 300 can be expressed in the following SQL statement:

| SELECT | s.supplier_name | |
|---|---|---|
| , | ph.po_number\|'–´\|ph.po_revsion | |
| , | i.item_description | |
| , | i.item_number | |
| , | pl.price | |
| , | pl.quantity | |
| , | ps.due_date | |
| , | b.buyer_name | |
| , | ph.header_id | |
| , | pl.line_id | |
| , | ps.shipment_id | |
| , | ph.supplier_id | |
| , | ph.buyer_id | |
| , | pl.line_id | |
| FROM | po_headers | ph |
| , | po_lines | pl |
| , | po_shipments | ps |
| , | suppliers | s |
| , | items | i |
| , | buyers | b |
| WHERE | ph.header_id = pl.header_id | |
| AND | pl.line_id = ps.line_id | |
| AND | pl.item_id = i.item_id | |
| AND | ph.supplier_id = s.supplier_id | |
| AND | ph.buyer_id = b.buyer_ id ; | |

The developer can hand-tune and manipulate the SQL statement at runtime. For example, the search criteria illustrated in the user interface may be passed to the query. When the query is executed, the Java domain objects that own the selected data are instantiated, but not automatically fully populated. In a preferred embodiment, all of the attributes for the Java domain object are retrieved as soon as a method needs a value that was not populated when the object was instantiated.

Exemplary use of Query Object

Figure 6:
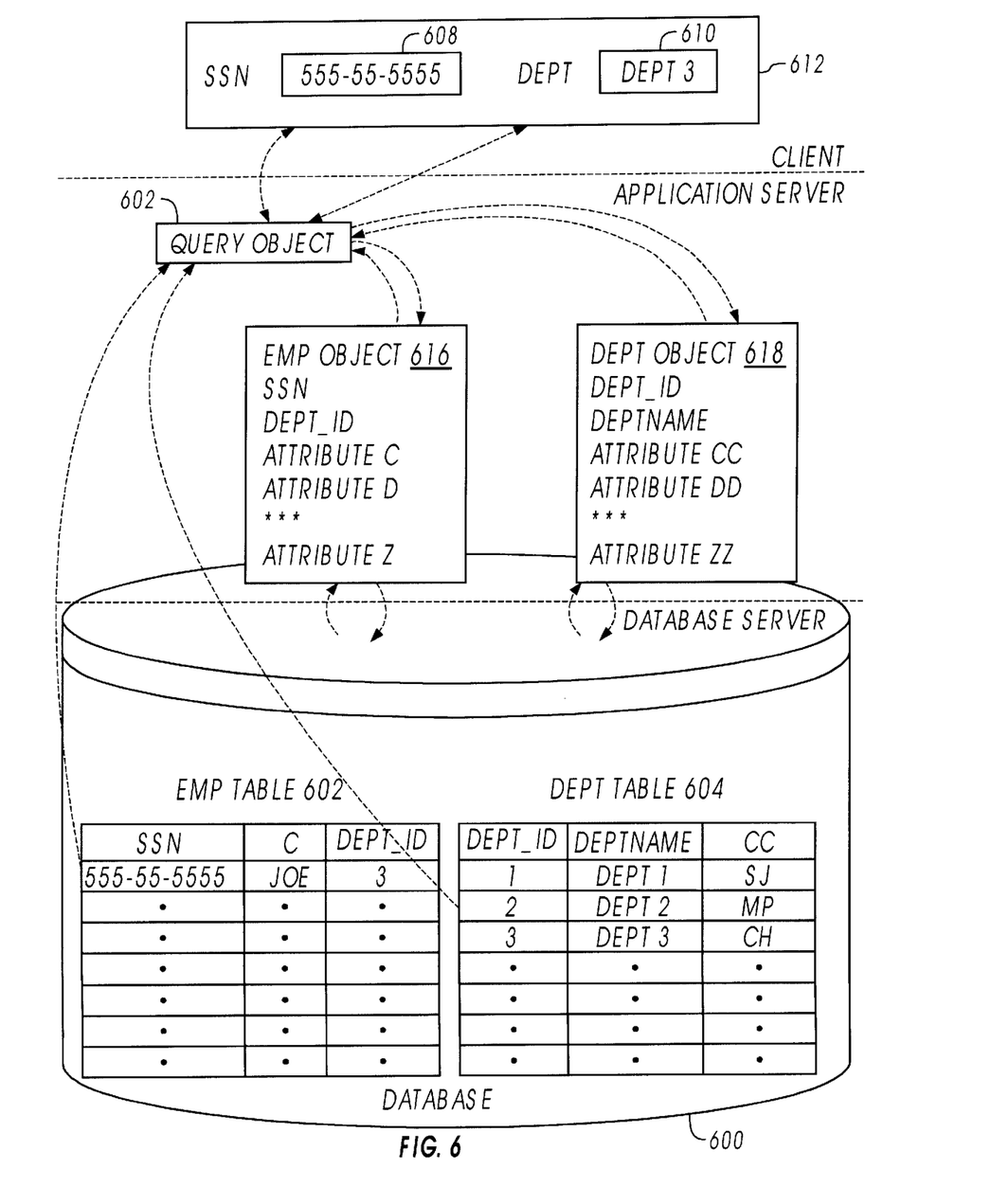
FIG. 6 is a block diagram illustrating a system that uses query objects to retrieve data from a relational database system according to an embodiment of the invention.
Figure 7:
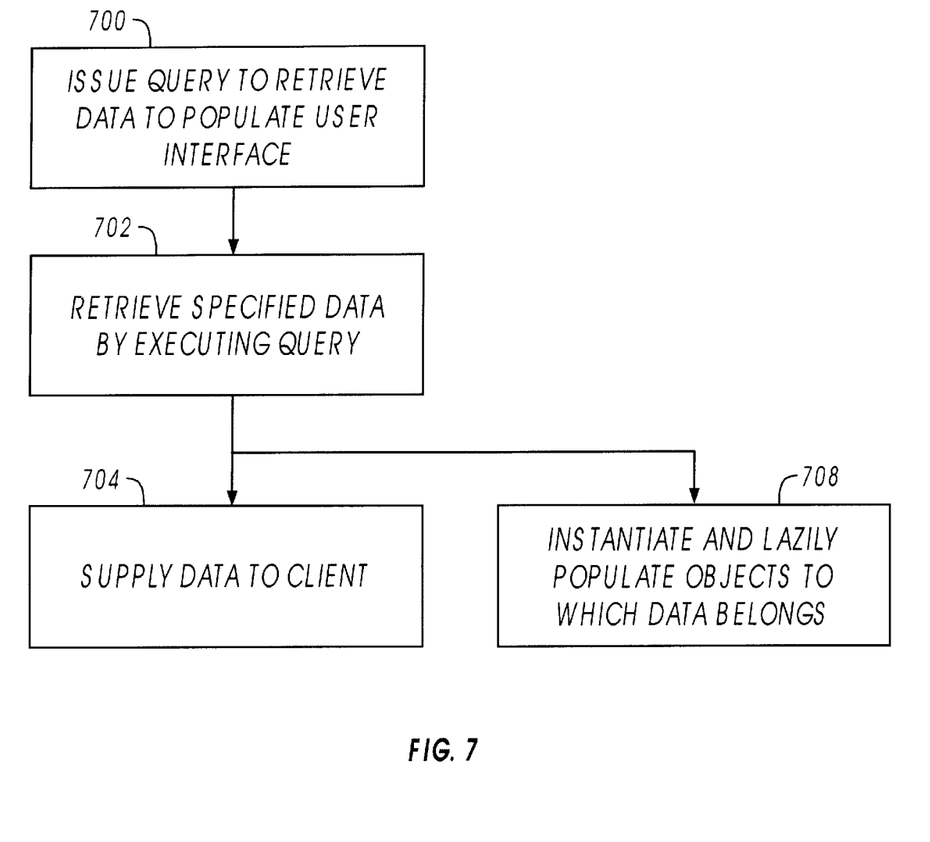
FIG. 7 is a flowchart illustrating steps for retrieving data that belongs to domain objects according to an embodiment of the invention.
Figure 8:
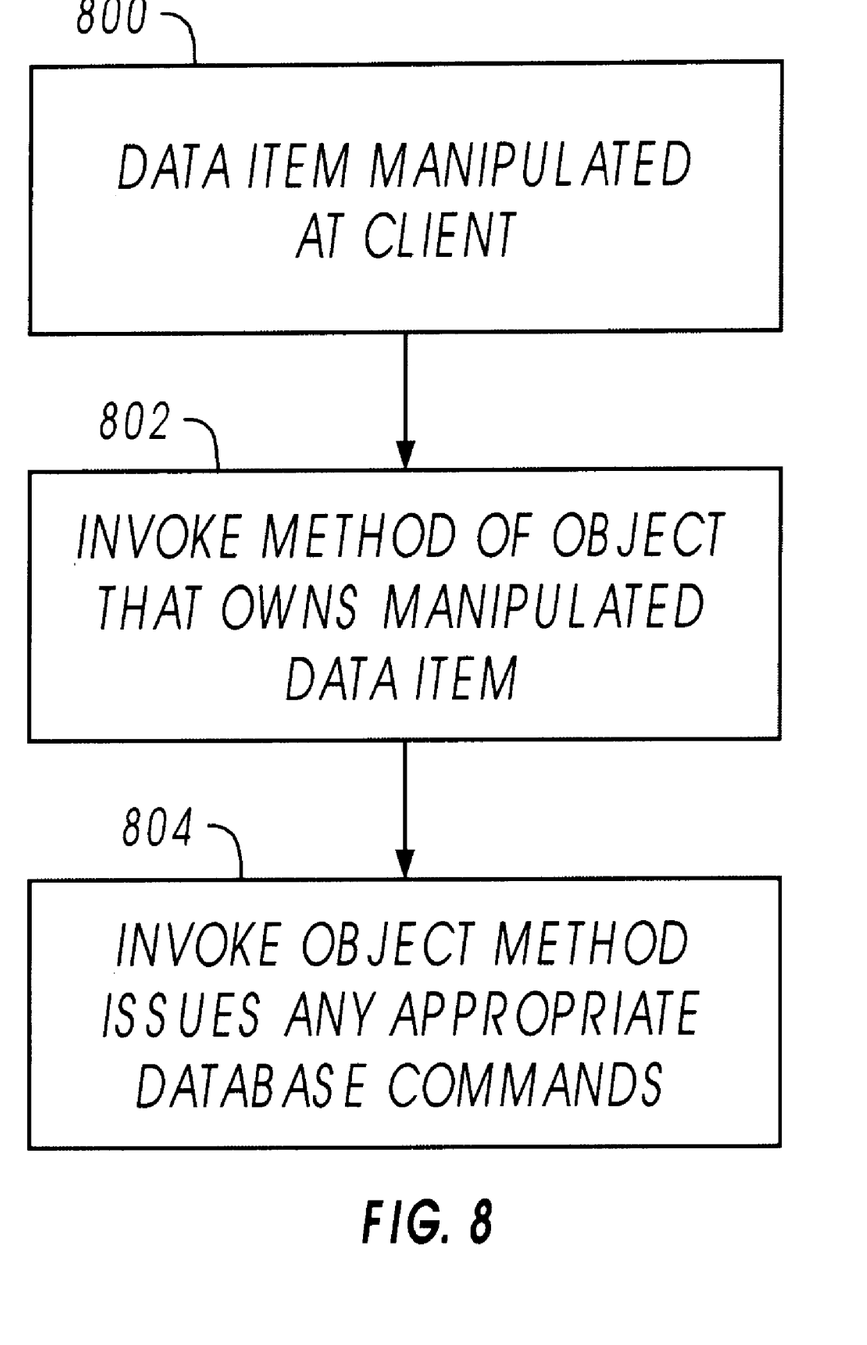
FIG. 8 is a flowchart illustrating steps for manipulating data that belongs to domain objects according to and embodiment of the invention.

FIGS. 7 and 8 are flowcharts that respectively illustrate the steps involved in using a query object to retrieve and store data in a relational database system. For the purpose of explanation, the flowcharts of FIGS. 7 and 8 shall be described in reference to the system shown in FIG. 6.

In FIG. 6, a user interface 612 on a client has a social security number UI component 608 and a department name UI component 610. The social security number UI component 608 is bound, through a query object 620 executing on an application server, to the SSN column of an emp table 602 of a database 600. The department name UI component 610 is bound through query object 620 to the DEPTNAME column of a dept table 604 of the database 600.

Referring to FIG. 7, a client-side application instantiates user interface 612 and issues a command to query object 620. In response, query object 620 issues a database command to the database server that manages database 600 to retrieve data to populate UI components 608 and 610 (step 700). The database server executes the database command and retrieves the data specified in the command (step 702). The data thus retrieved is supplied to the query object 620, which delivers the data to the client (step 704). The database application causes the retrieved data to be displayed in the UI components 608 and 610.

By inspecting relational-to-object structure mapping information, the query object 620 determines that the data delivered to the client corresponds to attributes of two objects. Specifically, the social security number value corresponds to the SSN attribute of an emp object 616, and the department name value corresponds to the DEPTNAME attribute of a department object 618.

In response to the command from the database application, the query object 620 instantiates the objects to which the retrieved data belongs (step 708). However, during the instantiation process, all of the attributes of objects 616 and 618 are not automatically retrieved from the database 600. According to one embodiment, only those attributes are populated that correspond to values already retrieved by query object 620 to answer the query. In the present example, only the SSN and DEPT_ID attributes of emp object 616 are populated, and only the DEPT_ID and DEPTNAME attributes of dept object 618 are populated.

Because only the data that is required to populate user interface 612 is delivered to the client, the retrieval of data through query object 620 does not produce unnecessary traffic between the client and the server. Further, because the database server does not automatically populate all of the UI components of objects 616 and 618, the instantiation of the objects 616 and 618 does not result in a significant performance penalty. Once instantiated, however, the objects 616 and 618 are available for handling subsequent post-retrieval processing, as shall now be described with reference to FIG. 8.

Referring to FIG. 8, at step 800 the user of the database application updates the social security number listed in UI component 608. Rather than directly issuing an update command to the database to update the emp table 602 to reflect the new social security number, the client sends the query object 620 notification of the update, and query object 620 responds to the update by invoking the appropriate method of the object to which the updated value belongs (step 802). In the present example, the updated value belongs to the SSN attribute of the emp object 616. Consequently, the query object 620 responds by calling a setSSN() method of emp object 616. The setSSN( ) method of emp object 616 incorporates the domain logic that applies to the SSN attribute. For example, the setSSN( ) method may include logic that rejects social security numbers that are in the wrong format, do not have the correct number of digits, or that include non-numeric characters. The domain object method thus invoked is responsible for executing all appropriate database commands (step 804) to ensure that operation specified by the user is handled correctly. Any notifications resulting from data changes in the domain objects may then be returned to the query object 620, which in turn notifies the client.

In the foregoing example, the client where the UI code is executed, the application server where the domain and query objects are executed, and the database server where the database commands are executed, represent three distinct tiers. However, these tiers are logical, and need not correspond to any physical divisions. For example, the application server may reside within the database system, outside the database system but on the same machine as the database system, or on a completely separate machine than the database system. Similarly, the client may or may not reside on the same machine as the application server and database system.

An update to a value displayed by a user interface is only one example of an event that would result in an invocation of a method of a domain object that has been instantiated by a query object. To ensure that the domain logic that governs a data item is executed, all attempts to manipulate a data item that belongs to an object should be done through the methods provided by the object. During execution of a method thus invoked, attributes of the object are populated on an as-needed basis. For example, assume that attribute D of emp object 616 indicates "years with company", and that attribute Z of emp object 618 indicates "age of employee". The logic of the setD method may include a check that the specified years with company value is not greater than the age value specified in attribute Z. However, at the time that the setD() method is invoked, the attribute Z value for emp object 618 may not have been populated. Consequently, in response to the invocation of setD, the age value for emp object 616 is retrieved from the database 600 and used to populate attribute Z of emp object 616, thus allowing execution of the setD logic. In a preferred embodiment, all of the attributes for the emp object 618 are retrieved as soon as a method needs a value that was not populated when the object was instantiated.

Concurrent use of Domain Objects

A single transaction may involve the execution of numerous query objects. It is possible for two or more of the query objects in a transaction to access data items that belong to the same domain object. For example, the same transaction that is associated with query object 620 may be associated with a second query object that retrieved attribute Z of emp object 616. The fact that two queries are accessing attributes of the same domain object may be detected, for example, by a comparison of the primary key values that have been retrieved by the query objects.

For example, assume that DEPT_ID is the primary key of dept table 604, and that a first query object has retrieved the DEPTNAME of the row where DEPT_ID =3. During the retrieval operation, the DEPT_ID value of the row would also have been retrieved. The first query object would instantiate dept object 618. A second query object may call for the retrieval of attribute CC from the row where DEPT_ID =3. During the retrieval operation, the DEPT_ID value of the row would also be retrieved. However, before instantiating a second copy of the same dept object 618, it is determined that the dept object associated with the DEPT_ID =3 has already been instantiated. Consequently, the second query object would not instantiate a second copy of the dept object, but merely populate the attributes that it has retrieved (attribute CC in the present example) if they have not already been populated.

Hardware Overview

Figure 9:
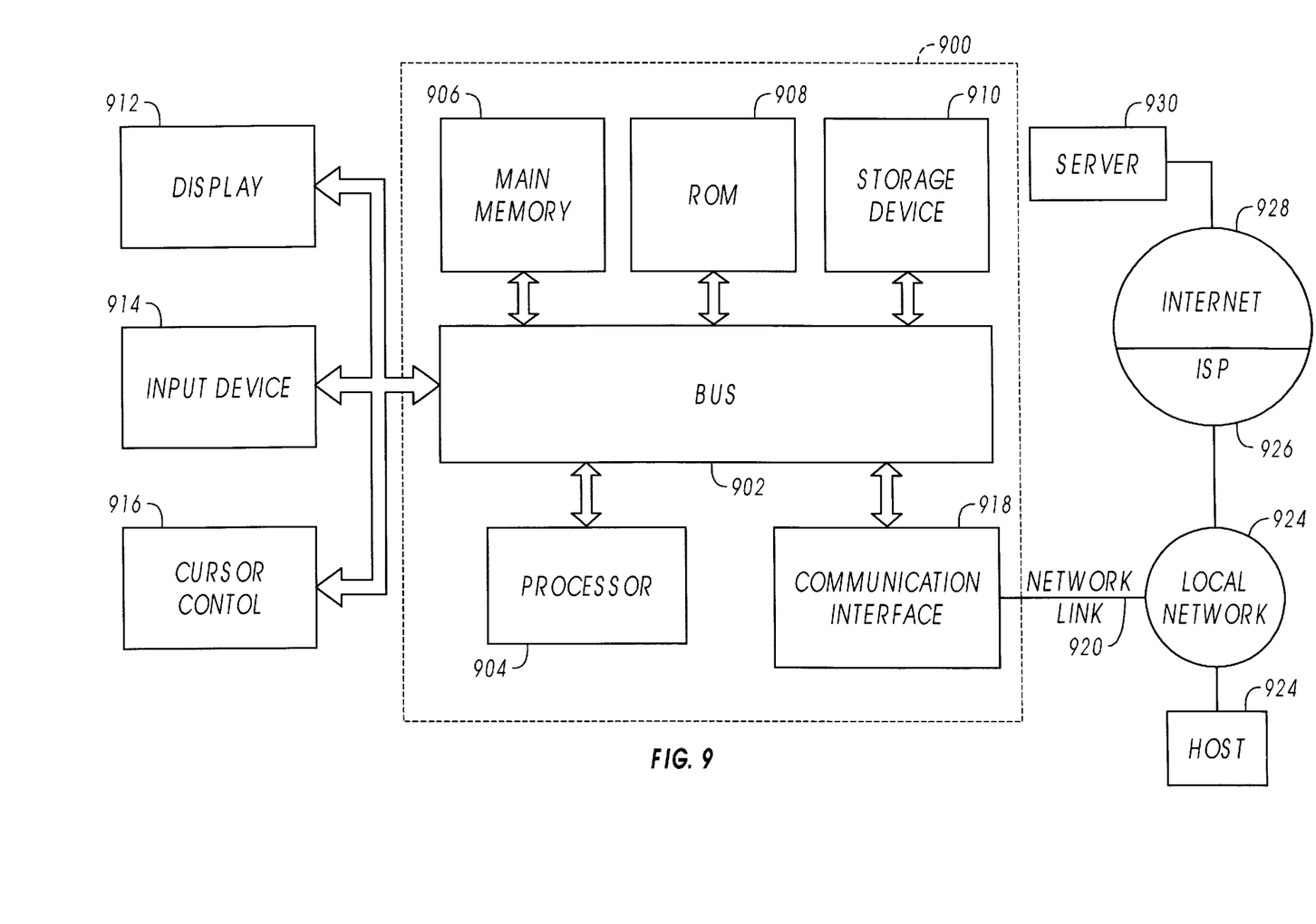
FIG. 9 is a block diagram of a system on which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for accessing domain object data stored in relational database systems. According to one embodiment of the invention, domain object data is accessed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for accessing domain object data stored in relational database systems, as described herein.

The received code may be executed by processor 904 as it is received, and/or stored in storage device 910, or other non-volatile storage for later execution. In this manner, computer system 900 may obtain application code in the form of a carrier wave.

Advantages

The use of QueryObjects, as described herein, results in numerous advantages over prior approaches. For example, the QueryObject approach facilitates code reuse, thus enhancing developer productivity and product quality. In particular, a developer can build domain objects with their associated business rules once and reuse them repeatedly regardless of what "shape" the user interface takes, or what technology it is hosted in. This ability yields several benefits. For example, domain logic encapsulation is not violated. If one well-tested domain object is reused multiple times—and not replicated (often incorrectly) in numerous implementations—product quality is enhanced. Since it is so easy to build different UIs on the same domain logic, developers are encouraged to satisfy user demands for specific front end capabilities that might otherwise be dismissed as too time consuming. QueryObjects can be reused, which is attractive when a WHERE clause includes complex domain logic. Furthermore, the WHERE clause itself can be reused.

With respect to performance, the QueryObject can be based on a view, a table, or a SQL statement specified at runtime which lets the developer hand-tune the query for optimal fetching. This accessibility is particularly important if the user is free to drive queries using data values from secondary objects (e.g. locating all purchase orders whose item description includes the word 'DESK'). In traditional object-oriented frameworks, the developer must ring all affected domain objects into memory and then manage the filtering programmatically. It is far more efficient to exercise the query directly against the database so you can take advantage of the powerful capabilities for filtering, ordering and so on, provided by the database server.

In addition, using QueryObjects, data that is not needed by the user interface for display purposes need not be sent to the client at all, thus reducing network traffic between the server and the client that is executing the user interface. Further, domain objects "complete" themselves on an as-needed basis when their methods are called, thus eliminating overhead that would otherwise be wasted in retrieving data to fully populate a domain object, where much of the data would never actually accessed or used.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing domain object data stored in a relational database system, the method comprising the steps of:
   supplying to a client one or more data items that are attributes of one or more domain objects in a manner that circumvents the one or more domain objects by retrieving the one or more data items directly from one or more relational structures that contain the one or more data items; and responding to manipulations of said one or more data items at said client by invoking methods of said one or more domain objects.

2. The method of claim 1 further comprising the step of, in response to retrieving the one or more data items directly from the one or more relational structures, instantiating said one or more domain objects without automatically fully populating said one or more domain objects.

3. The method of claim 2 wherein the step of instantiating said one or more domain objects includes initially populating only those attributes of said one or more domain objects that correspond to said one or more data items.

4. The method of claim 1 further comprising the step of responding to an invocation of a method of said one or more domain objects by retrieving from said relational database system values for only those attributes of said one or more domain objects that:
   are required to execute said method; and
   have not already been populated.

5. The method of claim 1 wherein:
   the client is connected to a server over a network;
   the method further comprises the step of, in response to retrieving the one or more data items directly from the one or more relational structures, instantiating said one or more domain objects on said server; and
   the step of supplying to said client one or more data items is performed by sending, from said server to said client over said network, data for only those attributes of said one or more domain objects that are required by a user interface presented by said client.

6. The method of claim 2 further comprising the steps of:
   retrieving a first set of primary keys associated with said one or more data items;
   receiving a subsequent request from said client for a second set of one or more data items;
   retrieving a second set of primary keys associated with said second set of one or more data items;
   determining, based on said first set of primary keys and said second set of primary keys, whether domain objects corresponding to said second set of one or more data items have already been instantiated; and
   instantiating the domain objects that correspond to said second set of one or more data items and that have not already been instantiated.

7. A computer-readable medium carrying one or more sequences of instructions for accessing domain object data stored in a relational database system, wherein execution of the one or more sequences of instructions by one or more processors causes the one or more processors to perform the steps of:
   supplying to a client one or more data items that are attributes of one or more domain objects in a manner that circumvents the one or more domain objects by retrieving the one or more data items directly from one or more relational structures that contain the one or more data items; and
   responding to manipulations of said one or more data items at said client by invoking methods of said one or more domain objects.

8. The computer-readable medium of claim 7 further comprising instructions for the step of, in response to retrieving the one or more data items directly from the one or more relational structures, instantiating said one or more domain objects without automatically fully populating said one or more domain objects.

9. The computer-readable medium of claim 8 wherein the step of instantiating said one or more domain objects includes initially populating only those attributes of said one or more domain objects that correspond to said one or more data items.

10. The computer-readable medium of claim 7 further comprising instructions for the step of responding to an invocation of a method of said one or more domain objects by retrieving from said relational database system values for only those attributes of said one or more domain objects that:
   are required to execute said method; and
   have not already been populated.

11. The computer-readable medium of claim 7 wherein:
   the client is connected to a server over a network;
   the computer-readable medium further comprises instructions for the step of, in response to retrieving the one or more data items directly from the one or more relational structures, instantiating said one or more domain objects on said server; and
   the step of supplying to said client one or more data items is performed by sending, from said server to said client over said network, data for only those attributes of said one or more domain objects that are required by a user interface presented by said client.

12. The computer-readable medium of claim 8 further comprising the instructions for the steps of:
   retrieving a first set of primary keys associated with said one or more data items;
   receiving a subsequent request from said client for a second set of one or more data items;
   retrieving a second set of primary keys associated with said second set of one or more data items;
   determining, based on said first set of primary keys and said second set of primary keys, whether domain objects corresponding to said second set of one or more data items have already been instantiated; and
   instantiating the domain objects that correspond to said second set of one or more data items and that have not already been instantiated.

13. A method for accessing a set of data items stored in a relational database system that are required by a user interface displayed by a client, wherein the set of data items correspond to a set of attributes that belong to one or more domain objects, the method comprising the steps of:
   retrieving said set of data items to populate said user interface without invoking methods of said domain objects by issuing to a server a query that selects said set of data items; and
   responding to manipulations of said set of data items at said client by calling methods provided by said domain objects.

14. The method of claim 13 further comprising the step of, in response to retrieving said set of data items, instantiating said one or more domain objects without automatically fully populating said one or more domain objects.

15. The method of claim 14 wherein the step of instantiating said one or more domain objects includes initially populating only those attributes of said one or more domain objects that correspond to said set of data items.

16. The method of claim 13 further comprising the step of responding to an invocation of a method of said one or more domain objects by retrieving from said relational database system values for only those attributes of said one or more domain objects that:
   are required to execute said method; and
   have not already been populated.

17. The method of claim 13 wherein:
   the client is connected to the server over a network;
   the method further comprises the step of, in response to retrieving said set of data items, instantiating said one or more domain objects on said server; and
   said set of data items are supplied to said client by sending, from said server to said client over said network, data for only those attributes of said one or more domain objects that are required by said user interface.

18. A computer-readable medium carrying one or more sequences of instructions for accessing a set of data items stored in a relational database system that are required by a user interface displayed by a client, wherein execution of the one or more sequences of instructions by one or more processors causes the one or more processors to perform the steps of:
   retrieving said set of data items to populate said user interface without invoking methods of said domain objects by issuing to a server a query that selects said set of data items; and
   responding to manipulations of said set of data items at said client by calling methods provided by said domain objects.

19. The computer-readable medium of claim 18 wherein the steps further comprise the step of, in response to retrieving said set of data items, instantiating said one or more domain objects without automatically fully populating said one or more domain objects.

20. The computer-readable medium of claim 19 wherein the step of instantiating said one or more domain objects includes initially populating only those attributes of said one or more domain objects that correspond to said set of data items.

21. The computer-readable medium of claim 18 wherein the steps further comprise the step of responding to an invocation of a method of said one or more domain objects by retrieving from said relational database system values for only those attributes of said one or more domain objects that:
   are required to execute said method; and
   have not already been populated.

22. The computer-readable medium of claim 18 wherein:
   the client is connected to the server over a network;
   wherein the steps further comprise the step of, in response to retrieving said set of data items, instantiating said one or more domain objects on said server; and
   said set of data items are supplied to said client by sending, from said server to said client over said network, data for only those attributes of said one or more domain objects that are required by said user interface.

23. A computer system for accessing domain object data stored in a relational database system, the computer system being configured to perform the following steps:
   supplying to a client one or more data items that are attributes of one or more domain objects in a manner that circumvents the one or more domain objects by retrieving the one or more data items directly from one or more relational structures that contain the one or more data items; and
   responding to manipulations of said one or more data items at said client by invoking methods of said one or more domain objects.

24. The computer system of claim 23 where the steps further comprise, in response to retrieving the one or more data items directly from the one or more relational structures, instantiating said one or more domain objects without automatically fully populating said one or more domain objects.

25. The computer system of claim 24 wherein the step of instantiating said one or more domain objects includes initially populating only those attributes of said one or more domain objects that correspond to said one or more data items.

26. The computer system of claim 23, wherein the steps further comprise responding to an invocation of a method of said one or more domain objects by retrieving from said relational database system values for only those attributes of said one or more domain objects that:

are required to execute said method; and have not already been populated.

27. The computer system of claim 23 wherein:

the client is connected to a server over a network;

the steps further comprise the step of, in response to retrieving the one or more data items directly from the one or more relational structures, instantiating said one or more domain objects on said server; and the step of supplying to said client one or more data items is performed by sending, from said server to said client over said network, data for only those attributes of said one or more domain objects that are required by a user interface presented by said client.

28. The computer system of claim 24, wherein the steps further comprise:

retrieving a first set of primary keys associated with said one or more data items;

receiving a subsequent request from said client for a second set of one or more data items;

retrieving a second set of primary keys associated with said second set of one or more data items;

determining, based on said first set of primary keys and said second set of primary keys, whether domain objects corresponding to said second set of one or more data items have already been instantiated; and instantiating the domain objects that correspond to said second set of one or more data items and that have not already been instantiated.

29. A computer system for accessing a set of data items stored in a relational database system that are required by a user interface displayed by a client, wherein the set of data items correspond to a set of attributes that belong to one or more domain objects, said computer system configured to perform the steps of:

retrieving said set of data items to populate said user interface without invoking methods of said domain objects by issuing to a server a query that selects said set of data items; and responding to manipulations of said set of data items at said client by calling methods provided by said domain objects.

30. The computer system of claim 29, wherein the steps further comprise the step of, in response to retrieving said set of data items, instantiating said one or more domain objects without automatically fully populating said one or more domain objects.

31. The computer system of claim 30, wherein the step of instantiating said one or more domain objects includes initially populating only those attributes of said one or more domain objects that correspond to said set of data items.

32. The computer system of claim 29, wherein the steps further comprise responding to an invocation of a method of said one or more domain objects by retrieving from said relational database system values for only those attributes of said one or more domain objects that:

are required to execute said method; and have not already been populated.

33. The computer system of claim 29 wherein:

the client is connected to the server over a network;

the steps further comprise the step of, in response to retrieving said set of data items, instantiating said one or more domain objects on said server; and said set of data items are supplied to said client by sending, from said server to said client over said network, data for only those attributes of said one or more domain objects that are required by said user interface.

* * * * *